United States Patent [19]
Hirata et al.

[11] 3,952,319
[45] Apr. 20, 1976

[54] PLURAL IMAGE CAMERA HAVING AUTOMATIC EXPOSURE CONTROL

[75] Inventors: Noritsugu Hirata, Yokohama; Kiyoshi Takahashi, Tokyo; Mitsutoshi Ogiso, Kawasaki, all of Japan

[73] Assignee: Canon Kabushiki Kaisha, Tokyo, Japan

[22] Filed: Nov. 9, 1973

[21] Appl. No.: 414,453

Related U.S. Application Data

[63] Continuation-in-part of Ser. No. 344,724, March 26, 1973, abandoned, which is a continuation of Ser. No. 152,070, June 11, 1971, abandoned.

[30] Foreign Application Priority Data

June 19, 1970 Japan.................................. 45-53663

[52] U.S. Cl.................................. 354/109; 352/93
[51] Int. Cl.² ......................................... G03B 17/24
[58] Field of Search..................... 95/1.1; 354/109; 352/93, 141

[56] References Cited
UNITED STATES PATENTS

| | | |
|---|---|---|
| 2,998,761 | 9/1961 | Cooper .................................. 95/1.1 |
| 3,495,267 | 2/1970 | Brodie .................................. 95/1.1 |

*Primary Examiner*—John F. Gonzales
*Attorney, Agent, or Firm*—Toren, McGeady and Stanger

[57] ABSTRACT

Automatic and rapid exposure control is incorporated in a camera having facilities for directing, along a common path, a pair of independent noncoincident light beams from an external object and from a separately illuminable item, such as a databearing transparency within the camera. A photoelectric circuit responsive to the total quantity of the directed light generates a proportional control voltage for operating an adjustable diaphragm to maintain a predetermined incident level of the directed light on the camera film and/or controlling the item illuminator or an auxiliary illuminator for the external object. Threshold controlled, motor-instrumented apparatus may be additionally provided to advance the film, to selectively operate a camera shutter, and to illuminate the item in response to trigger signals generated, e.g., upon the detection of the presence of the external object.

21 Claims, 4 Drawing Figures

PLURAL IMAGE CAMERA HAVING AUTOMATIC EXPOSURE CONTROL

CROSS-REFERENCE TO RELATED APPLICATIONS

This application is a continuation-in-part of applicants' copending application Ser. No. 344,724, filed Mar. 26, 1973, and entitled "Multiple Information recording system", which in turn is a continuation of application Ser. No. 152,070, filed June 11, 1971, both now abandoned.

BACKGROUND OF THE INVENTION

This invention relates to improvements in plural image cameras of the type having facilities for superimposing on a common film portion noncoincident imaging light beams from an external object and from a separately illuminable item such as an internal transparency. Examples of such arrangements are shown, e.g., in U.S. Pat. No. 3,111,887, issued to W. G. Alexander on Nov. 26, 1963; U.S. Pat. No. 3,376,800, issued to W. Faasch on Apr. 9, 1968; and U.S. Pat. No. 3,495,267, issued to I. Brodie on Feb. 10, 1970.

Multi-image arrangements of this type have in the past employed certain limited adjustments of the quantity of light incident on the camera film. Such adjustments, however, generally have been restricted to still-camera applications and have normally required the manual variation of the transparency illumination after a subjective inspection of the composite images on the film by an observer with the aid of a view finder. Certain of these arrangements, exemplified by the above-mentioned U.S. Pat. Nos. 3,376,800 and 3,495,267, employ known beam-splitting techniques to permit the viewing of the superimposed images prior to exposure.

Such limited manual exposure adjustments are slow and cumbersome even for still camera applications, and are completely impractical for moving picture camera applications.

An object of the present invention, therefore, is to provide an improved multi-image camera having facilities for rapidly and automatically adjusting the exposure of a composite image directed at the camera film.

A related object is to provide facilities for incorporating improved automatic exposure control in a moving picture camera of the multi-image type.

SUMMARY OF THE INVENTION

These and other related objects are accomplished with the improved multi-image camera of the present invention, which includes a photosensitive control circuit for generating a control voltage proportional to the total light energy incident on the film. A mechanical link movable in proportion to such control voltage is employed to operate an adjustable diaphragm to maintain the incident level at a predetermined value. Facilities responsive to the control voltage may be provided for disabling the item illuminator after such illuminator has been triggered upon the detection of the presence of an external object. In such arrangement, which is suitable for optical surveillance purposes, additional apparatus responsive to such control voltage may be employed to enable an auxiliary illuminator for the detected object.

The camera may further include a motor responsive to separate start and stop command signals for operating a shutter positioned in front of the film plane and an advancing mechanism that increments successive portions of the film past the shutter. Facilities are provided in such a case to detect the conclusion of advance of a film strip having a predetermined plurality of frames, and to trigger on a high-intensity item illuminator to overexpose the last frame of the strip. In this case, the control voltage generated in response to the increased light caused by the triggering of the item illuminator disables such illuminator and initiates a stop command to the motor.

BRIEF DESCRIPTION OF THE DRAWING

The invention will be further set forth in the following detailed description taken in conjunction with the appended drawing, in which.

DETAILED DESCRIPTION OF PREFERRED EMBODIMENTS

Figure 1:
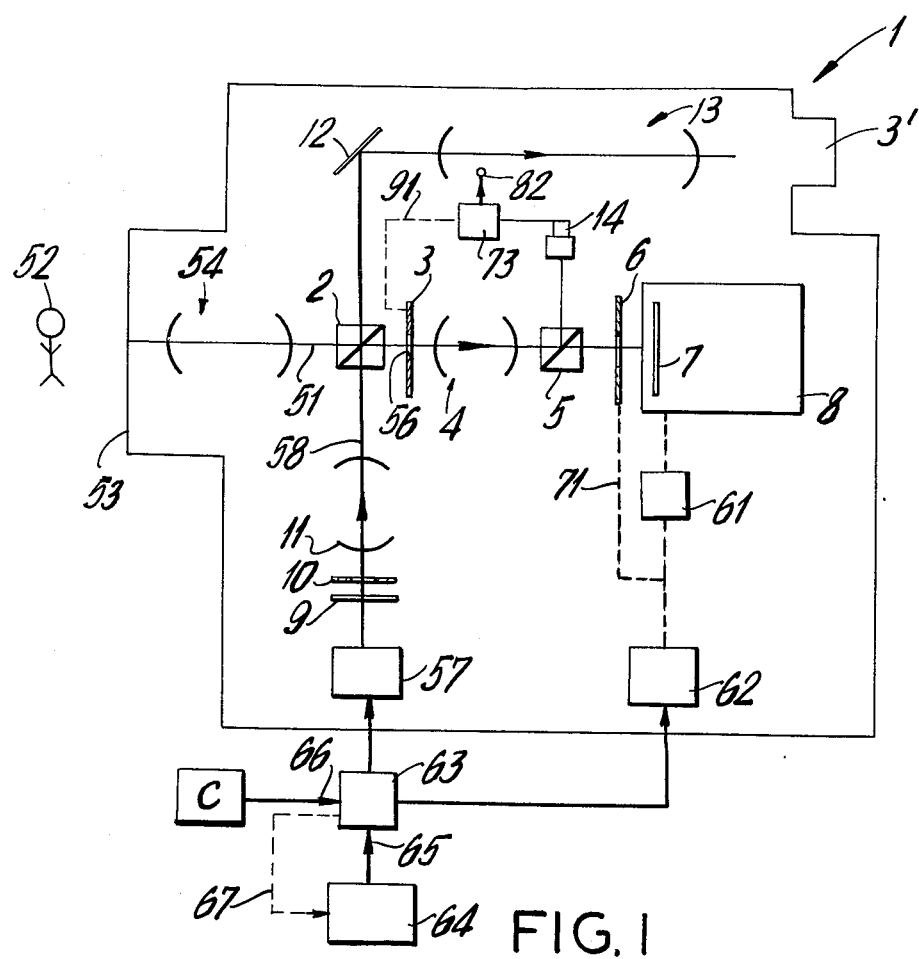
FIG. 1 is a pictorial diagram of a multi-image moving picture camera having automatic exposure control facilities in accordance with the invention.

In FIG. 1 a multi-image moving picture camera 1 carries a film magazine 8. The magazine contains a movable film strip 7 having a succession of film frames, which may be successively brought into alignment with a main camera axis 51 for receiving a portion of a first imaging light beam from an external object 52. The path traversed by the first beam, which enters the camera through an input port 53, includes a variable magnification lens system or pair 54-54, a beam splitter 2, an adjustable aperture 56 of a diaphragm 3, an imaging lens system or pair 4—4, a second beam splitter 5 and a shutter 6.

The camera 1 also includes optical means for projecting on the same aligned film frame that receives the image of the object 52, an image of a second object 9 (typically an internally mounted, data-bearing transparency). A second imaging light beam from the transparency 9 resulting from its illumination by a normally disabled illuminating source 57, is directed along an axis 58 perpendicular to the main camera axis 51 to the beam splitter 2 via a movable mask 10 and a tandem imaging lens system or pair 11—11. A portion of the second beam is redirected by the beam splitter 2 along the axis 51. The redirected beam passes through the diaphragm 3, the imaging lens system or pair 4—4, the beam splitter 5 and the shutter 6 to be superimposed on the film.

The transparency 9 may contain many patterns of data relevant to the object 52 and the mask 10 may be designed to select only a suitable portion of such data at any one time.

The beam splitter 2 also serves in a conventional way to direct a portion of each of the first and second beams incident thereon along the axes 51 and 58, to a view finder 3' through a reflecting mirror 12 mounted at a 45° angle to each of the axes 51 and 58 as shown, and a lens system or pair 13. The multiimage beam incident on the finder 3' contains qualitatively the same information as the multi-image beam incident on the film along the axis 51.

The camera is further provided with a normally disabled film advancing mechanism 61 coupled to the magazine 8 and driven by a motor 62. The motor responds to a start command signal from a triggerable threshold-operated signal source 63 to enable the advancing mechanism 61. The mechanism 61 responds by advancing the film strip 7 in a direction perpendicular to the main optical axis 51.

The advancing mechanism 61 may be disabled to stop the advance of the film strip 7 upon the application of a stop command signal from the threshold source 63 to the motor at a time established, e.g., by a suitable timer 64. The timer is coupled to a first input 65 of the threshold circuit 63. External trigger signals for initiating the start and stop command signals may also be separately entered into the source 63 via a second input 66, by trigger means C which may be manually operated or by automatic means as exemplified below. A semicontinuous ratchet-type movement of the film strip 7 may be instrumented by coupling a suitable feedback path 67 between the source 63 and the timer 64. Such path 67 may include delay means (not shown) to provide a fixed interval between successive command signals.

The motor 62 is further coupled via a link 71 to the shutter 6 such that the application of the start command signal to the motor 62 effects the opening of the shutter 6, thereby to admit light incident along the axis 51 to the film. Similarly, the application of a stop command signal to the motor 62 effects the closing of the shutter 6 to block light from the film.

A photosensitive detection means 14 is associated with the light beam from the beam splitter 5. In the arrangement of FIG. 1, the photodetector 14 is arranged to detect a portion of such light incident on the film.

Figure 2:
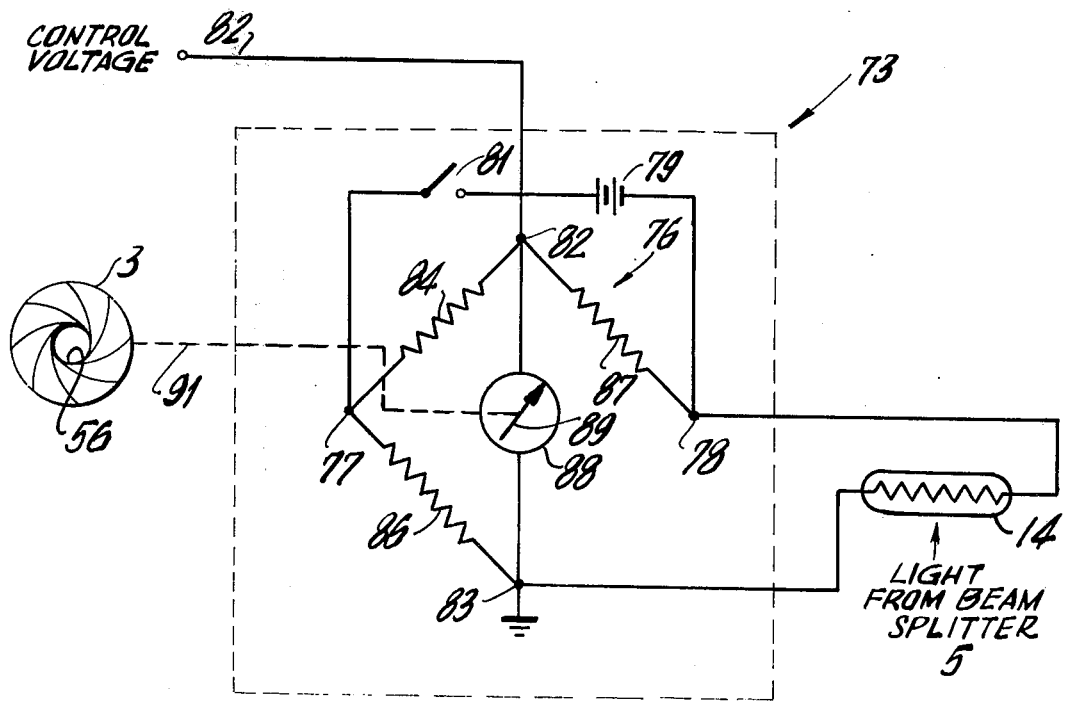
FIG. 2 is a combined schematic and pictorial diagram of a diaphragm adjustment arrangement forming part of the exposure control facilities of FIG. 1.

The photodetector output is coupled to a control circuit 73 (FIG. 2) The control circuit 73 includes a bridge 76 having a pair of input terminals 77 and 78 excited by a DC source 79 through a switch 81. A first path through the bridge between a pair of output terminals 82 and 83 thereof includes a pair of internal arms 84 and 86 in series. A second path between the terminals 82 and 83 includes an internal arm 87 serially connected with the photodetector 14, which as shown is embodied as a light sensitive resistor.

A galvanometer 88 is also connected between the output terminals 82 and 83 to measure the bridge output voltage, which in turn is proportional to the change in resistance of the element 14 caused by variations in the quantity of light incident thereon from the beam splitter 5.

A pointer arm 89 of the meter 88, whose movement is proportional to the unbalance of the bridge and thus to the voltage (hereafter "control voltage") at the bridge output, is mechanically coupled via a link 91 to the diaphragm 3 for varying the size of its aperture 56 in proportion to the movement of the arm 89. Consequently, the diaphragm opening varies in a manner corresponding to that of the light quantity falling on the element 14 and thereby to the quantity of light directed along the camera axis 51 (FIG. 1) from the beam splitter 2. With this scheme, the light incident on the film portion 7 may be maintained at a predetermined value.

Figure 3:
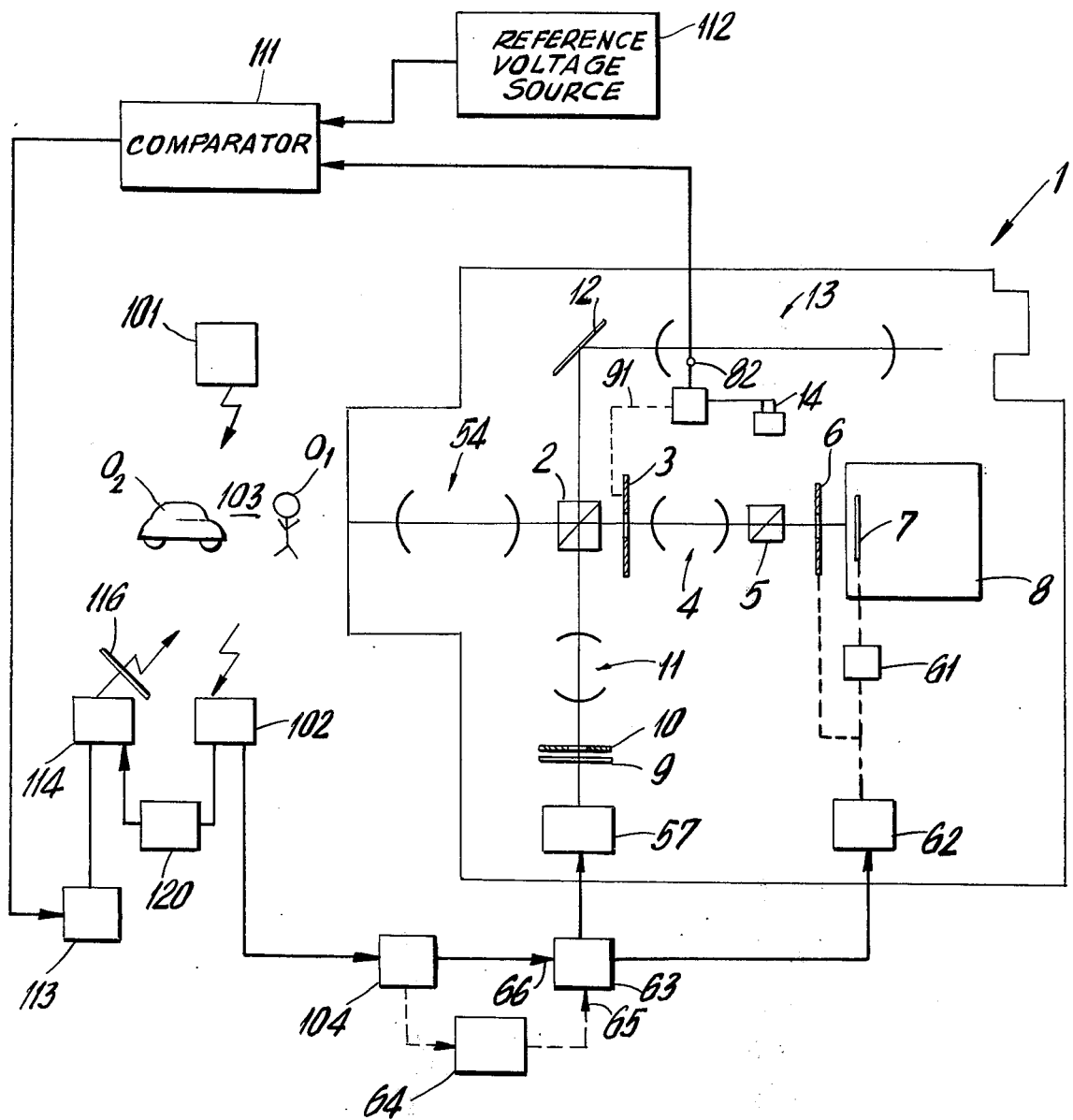
FIG. 3 is a pictorial diagram of a first arrangement employing the camera of FIG. 1, the arrangement including facilities for detecting the presence of an external object and for operating the camera in response to such detection.

The control voltage derived by the circuit 73 and externally accessible via output terminal 82, is also useful in an optical surveillance arrangement, e.g., a traffic monitoring system or a premises security system employing the camera 1. This last-mentioned security system is depicted in FIG. 3. A path is established between an illuminating lamp 101 and a triggerable photodetector 102. The detector 102 is activated upon the interposition in the path of an external object 103 (e.g. an intruder $O_1$ or the participants $O_1$ and $O_2$ in an accident). The activation of the detector 103 energizes input 66 of the threshold source 63 via a switch 104 and starts the timer 64. In response, the threshold source 63 applies a start command signal to the motor 62 for opening shutter 6; and also enables the illuminator 57 for the transparency 9; such transparency typically contains appropriate coded information such as the identification of the sensing station, the time the intrusion was detected, etc. A composite image including that of the detected object 103 and the superimposed data from the transparency 9 are consequently recorded on the then-aligned portion of the film strip 7. (Such film strip is advantageously made sensitive to radiation in the infra-fred range for the reasons indicated below.) According to one embodiment of the invention, the data on transparency 9 is identifying data. According to another embodiment, it is the time or both.

Since the now-energized motor 62 is also coupled to the film-advancing mechanism 61, a desired number of successive frames of the film strip 7 may be exposed to record the motion of the detected object 103 during the corresponding interval set by the timer 64.

The illumination of the lamp 57 upon detection of the object 103 causes a corresponding increase in the light incident on the photodetector 14. Such increase, manifested by an increase in the control voltage at the output of the control circuit 73, is coupled to one input of a comparator circuit 111. The other input of the comparator is connected to a reference voltage source 112. The output of the comparator 111 represents the deviation of the control voltage from the reference voltage and is applied to an input of a triggerable exciter 113 associated with an auxiliary illuminator 114 for the object 103. The illuminator 114 is excited when the output of the comparator exceeds a predetermined value.

The comparator inputs are adjusted so that when the quantity of light falling on the film portion 7 following the detection of the object 103 is insufficient for identification or other purposes, the photodetector 14, the control circuit 73 and the comparator 111 cooperate as just indicated to increase the illumination of the object 103 for correcting the problem.

For security purposes, the auxiliary illuminator 114 may be provided with an infra-fred filter 116 so that the augmented illumination of the object 103 is invisible to the eye. In such a case, the above-mentioned infra-fred sensitivity of the film portion 7 permits such increased illumination to be recorded on the film.

If desired, an additional switch 120 may be provided for directly exciting the auxiliary illuminator 114 upon the detection of the object 103 by the detector 102.

Figure 4:
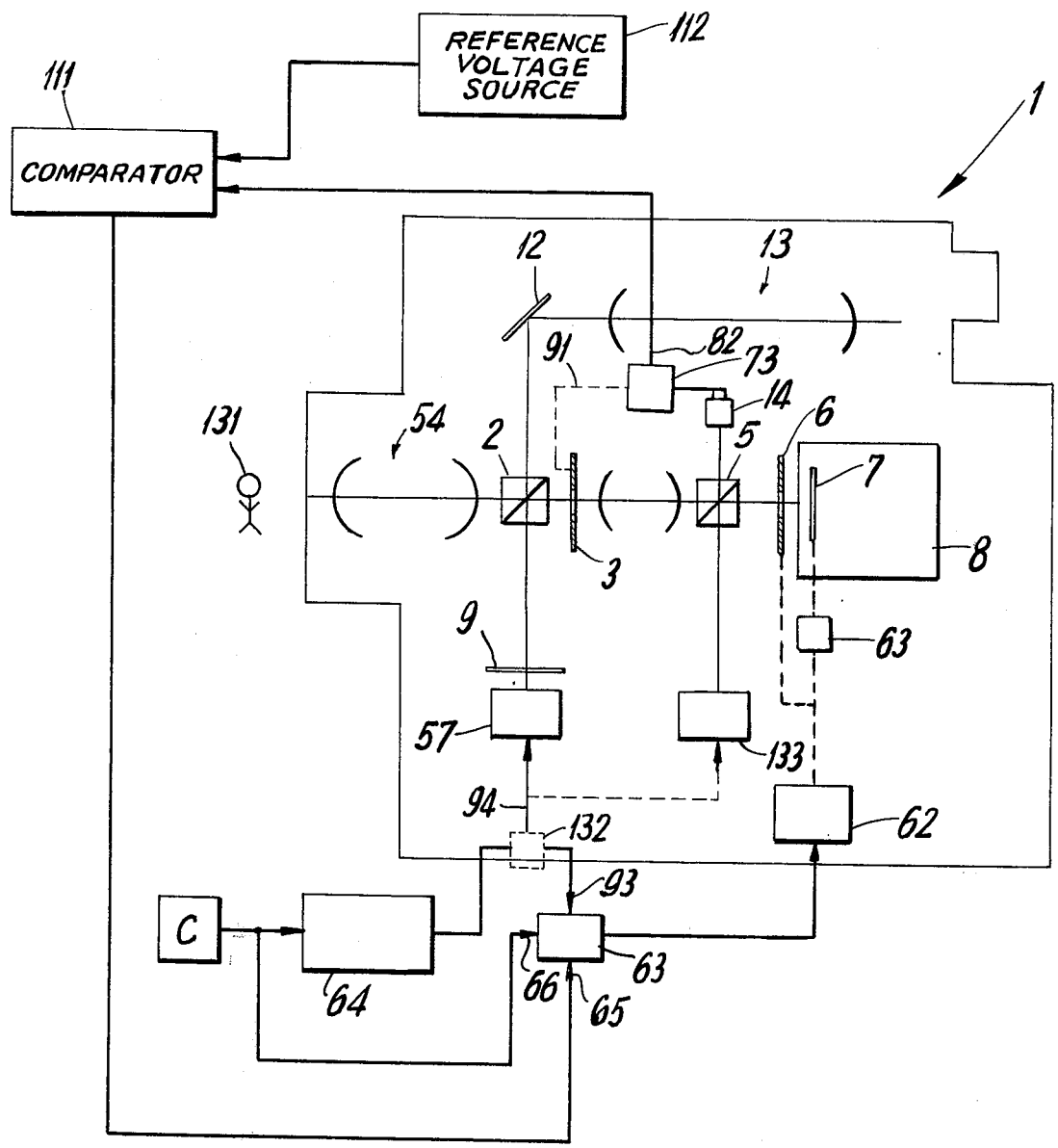
FIG. 4 is a pictorial diagram of a second arrangement employing the camera of FIG. 1 and incorporating facilities for identifying fixed-length segments of the camera film.

Another arrangement that advantageously employs the photodetection facilities of the camera 1 is shown in FIG. 4. In this scheme, the camera is normally operated in a single-image mode (i.e., to photograph only an external object 131) for a prescribed number of frames after the excitation of the input 66 of the threshold source 63 and the corresponding application of a start command signal to the motor 62. In this mode, the lamp 57 is maintained disabled because of the interposition of a delay circuit 132 (of suitable delay interval) between the timer 64 and the lamp 57.

The additional light incident on the film portion 7 when the lamp 57 is triggered on at the end of the delay interval is preferably made strong enough to overexpose the then-aligned film frame, which is the last frame in the associated interval. Such overexposed frame may be used as a marker for film editing or voice-picture synchronization purposes. To accomplish such overexposure, the lamp 57 may constitute a strong source of illumination in and of itself, or may act in parallel with a second lamp 133 directed on the beam splitter 5. In either case, the transparency 9 may be entirely composed of clear transmissive material or may be omitted entirely.

It will be evident that the increase in illumination when the lamp 57 is triggered on will also significantly increase the control voltage from the circuit 73. As in FIG. 3, such increased control voltage is compared in the comparator 111 with a reference voltage from the source 112. In the case of FIG. 3, however, the output of the comparator is coupled to the input 65 of the threshold source 63 to trigger a stop command signal for the motor 62, thereby to close the shutter 6 and stop the advance of the film strip.

If desired, an auxiliary output 93 of the delay line 132 may also be applied to the threshold source 63 to trigger a stop command signal thereto after the occurrence of the overexposed frame. In this situation, the auxiliary output 93 may illustratively be set to have a one frame delay relative to that at the main delay line output (designated 94) coupled to the lamp 57. In some cases, both the stop command signal from the source 63 and the enabling signal for the lamp 57 may be triggered by the main output 94 of the delay line, with the inertia of the motor providing the required one frame relative delay therebetween.

In the foregoing, the invention has been described in connection with preferred arrangements thereof. Many variations and modifications will now be evident to those skilled in the art. For example, while such arrangements have been set forth in connection with moving picture cameras, the concepts disclosed can readily be adapted for TV cameras, still cameras, etc. It is accordingly desired that the scope of the appended claims not be limited to the specific disclosure herein contained.

What is claimed is:

1. A plural image camera comprising:
   a first photographing optical means for forming an image of the light emitted from a first scene object on a film portion;
   a second photographing optical means for forming an image of the light emitted from a second scene object independent of the first scene object on said film portion;
   a beam splitter means disposed at the position where the optical axes of said first and second photographing means cross each other and being adapted to lead the light of the first scene object passing through said first photographing optical means together with the light of the second scene object passing through said second photographing optical means respectively to said film portion and to a finder optical system, said finder optical system being disposed in the path of the light split by said beam splitter means, so that the light emitted from the first and the second scene objects are simultaneously visible in said finder optical system;
   a detecting means responsive to the brightness of scene object for detecting the consolidated brightness of image of said first and second scene objects formed on said film portion, said detecting means being interposed between said beam splitter means and said film portion so as to provide an electric output signal corresponding to the consolidated brightness of said first and second scene objects; and
   a light control means for controlling incident light to keep the consolidated brightness of images formed on said film portion constant at all times, said control means being interposed between said beam splitter means and said detecting means to be controlled by the output signal of said detecting means.

2. A plural image camera as claimed in claim 1 wherein said detecting means is provided with a photometric circuit means having a photoelectric transforming element which generates an electric output signal corresponding to the signal for the brightness of said scene object, said photometric circuit means being mechanically linked at the output terminal thereof with said light flux control means.

3. A plural image camera as claimed in claim 2 wherein said photometric circuit means is provided with a bridge circuit and a metric member electrically connected with the output terminal of said bridge circuit, said metric member being mechanically linked at one portion thereof with said light flux control means.

4. A plural image camera as claimed in claim 1 wherein said light flux control means is a diaphragm mechanically linked with said detecting means for the brightness of a scene object.

5. A plural image camera as claimed in claim 1 wherein said second scene object is within the confines of said camera.

6. A plural image camera as claimed in claim 5 wherein said second scene object is a light source means.

7. A plural image camera as claimed in claim 6 wherein said light source means generates a data signal pictured on a fraction of said film portion.

8. A plural image camera as claimed in claim 6 wherein said light source means is electrically connected to a lighting control device for controlling lighting action of said light source means, said lighting control device having a timer means for controlling shutter release of said camera for a predetermined period of time so as to be controlled by the output signal of said timer means.

9. A plural image camera system comprising:
   a camera having a film driving means;
   means for controlling the film driving means of said camera,
   a first photographing optical means for forming an image of the light emitted from a first scene object disposed at the outside of the camera on a film portion;
   a second photographing optical means for forming on said film portion an image of the light emitted from a second scene object located within the inner part of said camera;

optical means for consolidating said scene objects arranged at the position where the optical axes of said first and said second photographing optical means cross each other, said scene object consolidating optical means leading the light of the first scene object passing through said first photographing optical means together with the light of the second scene object passing through said second photographing optical means to said film portion;

brightness detecting means for detecting the consolidated brightness of the images of said first and second scene objects which are formed on said film portion, said detecting means being interposed between said optical means and said film portion so as to provide an electric output signal corresponding to the brightness of said scene object;

a light control means for keeping the amount of light from said scene object which forms an image on said film portion constant at all times, said light control means being interposed between said optical means and said scene object brightness detecting means to be controlled by the output signal of said detecting means; and a scene object detecting means electrically coupled to said camera for detecting said first scene object and for controlling said driving means.

10. A plural image camera system as claimed in claim 9 wherein said brightness detecting means is provided with a photometric circuit means containing a photoelectric transforming element which generates an electric output signal corresponding to the signal for the brightness of said scene object, said photometric circuit means being mechanically linked at the output terminal thereof with said light flux control means.

11. A plural image camera system as claimed in claim 10 wherein said photometric circuit means is provided with a bridge circuit and a meter member electrically connected with the output terminal of said bridge circuit, said meter member being mechanically linked at one portion thereof with said light flux control means.

12. A plural image camera system as claimed in claim 9 wherein said light control means is a diaphragm mechanically linked with said brightness detecting means.

13. A plural image camera system as claimed in claim 9 wherein said second scene object is a light source means.

14. A plural image camera system as claimed in claim 13 wherein said light source means generates an optional data signal pictured on a fraction of said film portion.

15. A plural image camera system as claimed in claim 13 wherein said light source means is electrically coupled to a lighting control device for controlling the lighting action of said light source means, said lighting control means being adapted to be actuated by the output signal of said detecting means.

16. A plural image camera system as claimed in claim 9 wherein said driving means is mechanically linked with a shutter means having a shutter member disposed between said light control means and said film portion for effecting shutter release action of said shutter member said detecting means having an output connected to the said light control means for feeding brightness information to said light control means.

17. A plural image camera system as claimed in claim 16 wherein said shutter means comprises timer which actuates said shutter member intermittently at an interval of a certain predetermined period of time.

18. A plural image camera comprising:

a camera housing;

a first photographing optical means for forming on a film portion an image of the light emitted from a first scene object located outside of said camera housing;

a second photographing optical means for forming on said film portion an image of the light emitted from a second scene object accommodated within said camera housing;

an optical means for consolidating scene objects disposed at the position where the optical axes of said first and said second photographing optical means cross each other, said optical means leading the light of the first scene object passing through said first photographing optical means and the light of the second scene object passing through said second photographing optical means to said film portion;

brightness detecting means for detecting the consolidated brightness of said first and said second scene objects which form an image on said film portion, said brightness detecting means being disposed between said optical means and said film portion so as to provide an electric output signal corresponding to the brightness of a scene object;

a shutter means interposed between said brightness detecting means and said film portion, said shutter means being adapted to selectively control the incident light on said film portion from said first and said second scene objects and being provided with a means to be intermittently actuated at predetermined intervals of time; and a light control means for keeping the light amount of said scene object which forms an image on said film portion constant at all times, said light control means being interposed between said optical means and said brightness detecting means, said brightness detecting means having an output connected to the said light control means for feeding brightness information to said light control means.

19. A plural image camera as claimed in claim 18 wherein said detecting means for the brightness of a scene object is provided with a photometric circuit means containing a photoelectric transforming element which generates an electric output signal corresponding to a signal of the brightness of said scene object, said photometric circuit means being equipped with a bridge circuit and a metric member electrically coupled to the output terminal of said bridge circuit, and said metric member being mechanically linked at a portion thereof with said light control means.

20. A plural image camera as claimed in claim 18 where said means to be actuated is adapted to control the shutter means and a film feeding means for supplying the film passing on said film portion keeping an interlocking relation with each other.

21. The plural image camera claimed in claim 18 further comprising a finder optical system, said consolidating optical means directing a portion of the light from said first and second object scenes to said finder optical system.

* * * * *